J. J. LUCK.
PNEUMATIC TIRE.
APPLICATION FILED JAN. 24, 1913.
1,081,846.
Patented Dec. 16, 1913.
2 SHEETS—SHEET 2.
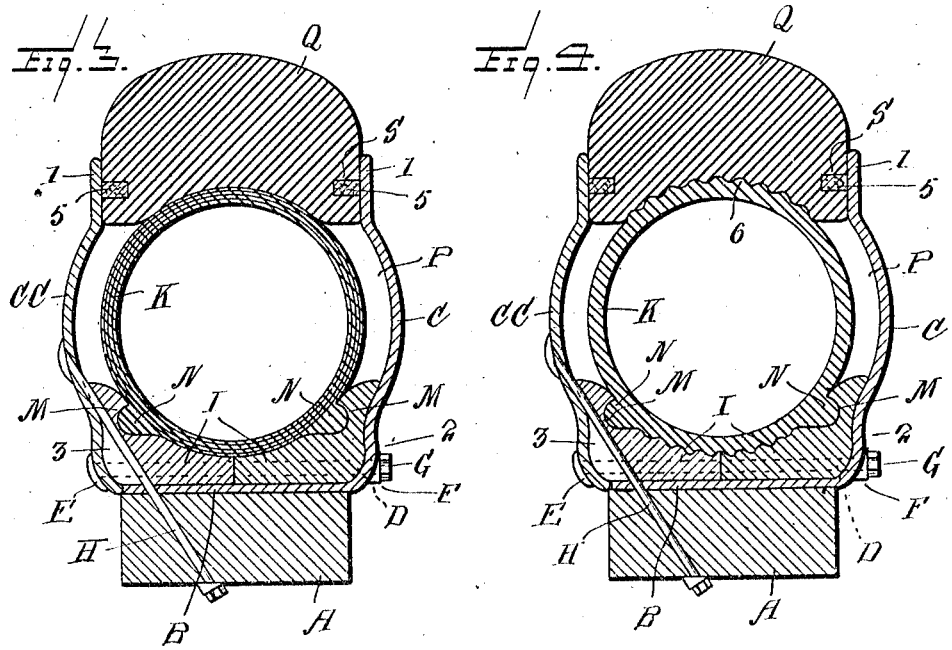
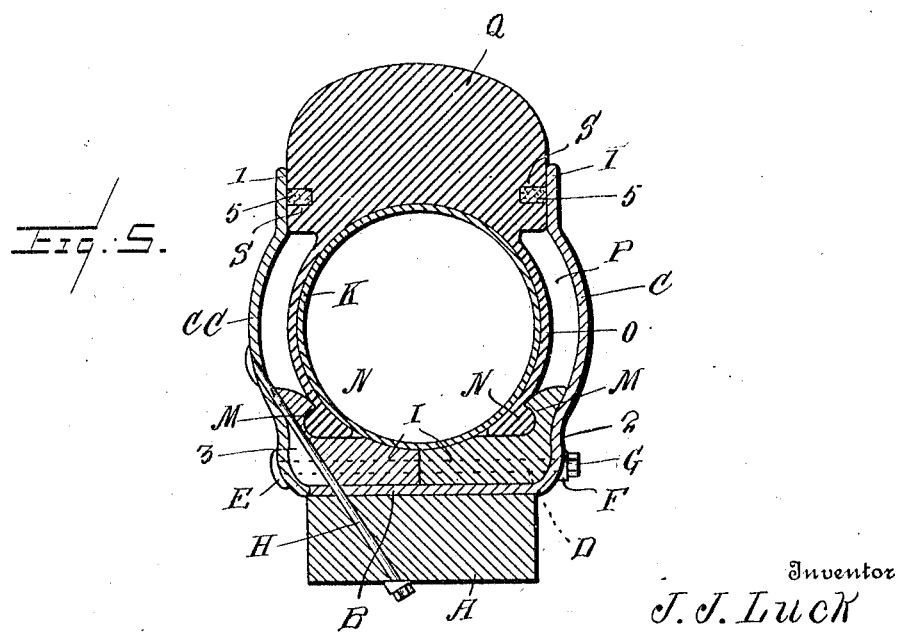
Inventor
J. J. Luck
Witnesses
E. R. Ruppert
V. B. Hillyard
By Victor J. Evans
Attorney

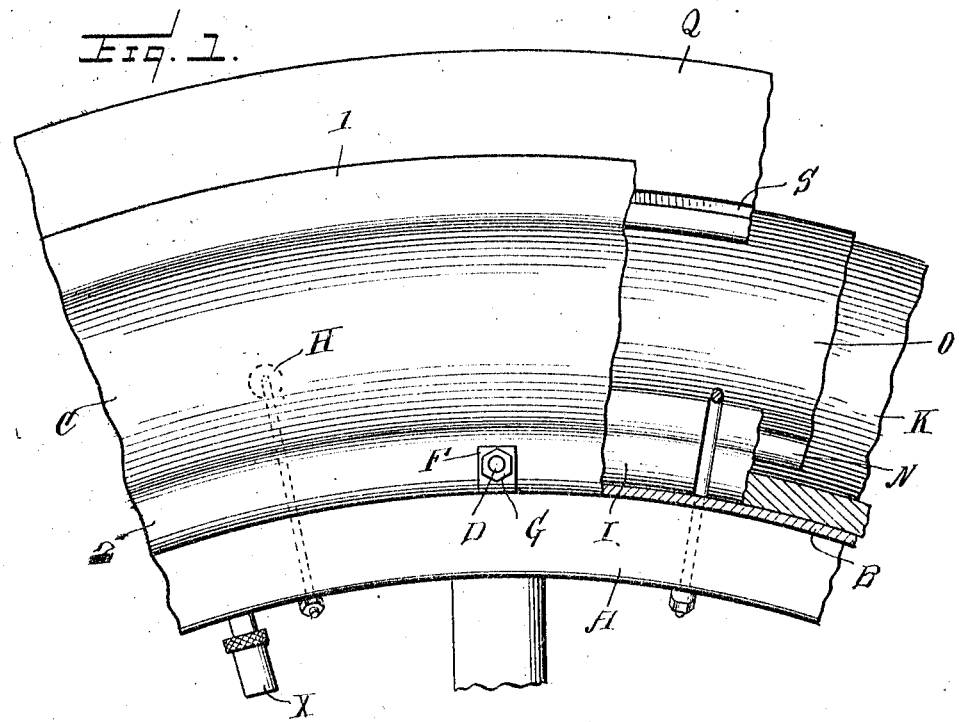
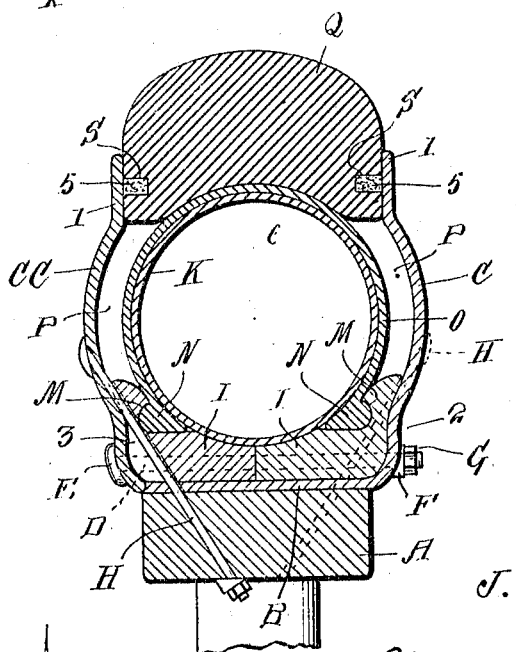

UNITED STATES PATENT OFFICE.

JOHN J. LUCK, OF SAN ANTONIO, TEXAS.

PNEUMATIC TIRE.

1,081,846.  Specification of Letters Patent.  Patented Dec. 16, 1913.

Application filed January 24, 1913.  Serial No. 744,020.

*To all whom it may concern:*

Be it known that I, JOHN J. LUCK, a citizen of the United States, residing at San Antonio, in the county of Bexar and State of Texas, have invented new and useful Improvements in Pneumatic Tires, of which the following is a specification.

The primary purpose of this invention is the provision of a tire for vehicle wheels possessing resilient qualities equaling the pneumatic tire as ordinarily constructed, but which is not susceptible to puncture, rim cut or blow-out, thereby overcoming the objections urged against the general use of the pneumatic tire as ordinarily constructed and adding largely to the convenience, comfort and pleasure of the motorist.

The invention provides a tire of the character hereinbefore mentioned embodying a hollow rim, a pneumatic tube located within the rim, a tread placed against the outer side of the pneumatic tube and movable within the rim and of such construction as to practically prevent any sharp object from piercing the tread and penetrating the pneumatic tube, a seat between the base of the hollow rim and the pneumatic tube, and means for preventing relative displacement of the parts.

The invention further consists of the peculiar formation of the hollow rim, the means for connecting the parts of such rim to one another and to the felly of the wheel, and the means for holding the pneumatic tube in a given position to guard against creeping and abrasive action, the hollow rim and pneumatic tube being of such relative dimensions as to provide side spaces into which the pneumatic tube may expand when subjected to compression when sustaining the load.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a view in elevation of part of a pneumatic tire embodying the invention, portions being broken away to show more clearly the relationship of the component elements. Fig. 2 is a transverse section on the line *x—x* of Fig. 1. Fig. 3 is a modification, showing ribs provided upon the sides of the pneumatic tube to form interlocking connection with the seat or filler. Fig. 4 is a further modification showing the pneumatic tube corrugated upon its inner and outer sides to make interlocking connection with the seat and the tread. Fig. 5 is a sectional view of a further modification, showing the tread formed with side flaps, the latter having ribs along their free edges to engage grooves in the seat or filler.

Corresponding and like parts are referred to in the following description, and indicated in all the views of the drawings, by the same reference characters.

While the invention provides a pneumatic tire designed most especially for automobiles it is to be understood that such tire may be applied to vehicle wheels generally.

The particular construction of the wheel is unimportant so long as it embodies a felly A or like part to which the tire may be fitted, said tire embodying a hollow rim which is arranged with the hollow side facing outward. The rim is preferably constructed of metal and embodies a base B and side members C and C C. The base and side members may be formed together or separately, but in the preferred construction the base B and one of the side members, as C, are formed as one part and the side member C C is separate, thereby admitting of the pneumatic tube, the seat or filler and the tread being easily placed in position or removed from the rim as occasion may require. The base portion B of the hollow rim fits close against the outer side of the felly A and is secured thereto in any way. The side members C and C C curve outwardly between their inner and outer edges. The outer edge portions of the members C and C C are parallel, as indicated at 1, to admit of the tread having an in and out movement and the inner edge portions of such side members are outwardly curved, as indicated at 2, to receive correspondingly curved portions of the seat or filler I, whereby such seat is retained in place. When the parts comprising the hollow rim and seat or filler are assembled they are secured to one another and to the felly A by means of bolts H and the side members of the rim and the sections comprising the seat or filler are further made secure by means of transverse bolts or fastenings D, which pass through openings formed therein, the heads E of the bolts conforming to the outwardly curved portion 2 of the side member C C and the projecting ends of the bolts receiving washers F and nuts G, the inner sides of the washers F conforming to the outwardly curved portion 2 of the side member C. The bolts H extend in opposite directions and constitute stays or braces. The inner ends of the bolts H extend through the felly A approximately on a medial plane and said bolts pass through the base A and side members of the rim in a diagonal direction.

The seat or filler I comprises similar parts or sections and may be formed of any suitable material, either metal or wood or a combination thereof. Of the metals aluminum is preferred because of its lightness and strength. Each of the halves or parts of the seat or filler may comprise any number of sections. The outer side of the seat or filler is made concave to conform to the inner portion of the pneumatic tube. Grooves or channels M are formed in side portions of the seat or filler and are adapted to receive ribs N forming a part of the pneumatic tube or a shoe inclosing the outer portion thereof. The portions of the seat exterior to the grooves M are made rounding to avoid injurious contact with the pneumatic tube or its protective and reinforcing shoe. Grooves 3 are formed in the outer sides of the seat or filler I to provide clearance for the stay bolts H, such grooves admitting of the seat or filler being placed in position or removed from the rim with the greatest facility.

The pneumatic tube K may be of any construction and is of such relative size compared with the space inclosed by the hollow rim as to leave spaces P between its sides and the side members C and C C of the rim into which the pneumatic tube may expand when subjected to vertical pressure, as when sustaining the load. The construction is such as to render it necessary to prevent creeping of the pneumatic tube and to hold it in a given relative position, hence securing means have been devised and in one form, as indicated most clearly in Fig. 3, the pneumatic tube is constructed of layers of canvas and rubber and is provided at its sides with ribs N, which are adapted to enter the grooves or channels M of the seat or filler. To further guard against movement the outer side of the inner portion of the pneumatic tube is corrugated, as indicated at 4, and matches corresponding corrugations formed upon the adjacent concave face of the seat or filler I. When the pneumatic tube is of usual construction, such as commonly provided in pneumatic tires, it is necessary to inclose the same in order to limit its expansion when inflated and for this purpose a shoe O is employed, said shoe having ribs N along its edges to enter the grooves or channels M.

The tread Q is yieldable, being preferably constructed of rubber and is of a sufficient thickness to prevent any sharp object from penetrating it and piercing the pneumatic tube. The tread Q fits between the outer parallel edge portions 1 of the side members of the hollow rim and is supported upon the pneumatic tube K and is movable in a manner somewhat similar to the outer portion of a pneumatic tire. Suitable packing 5 is interposed between the side portions of the tread Q and the outer portions 1 of the side members of the rim, such packing being fitted in grooves S formed in the sides of the tread. This packing prevents foreign matter from entering the space inclosed by the rim. In order to hold the tread in proper position it is necessary to prevent relative turning movement and this may be effected in a number of ways such as interlocking means between the tread and pneumatic tube or by forming the protective shoe as a part of the tread, as indicated in Fig. 5. As shown in Fig. 4 the inner side of the tread Q has corrugations 6, which match corresponding corrugations formed upon the outer side of the pneumatic tube. In the form shown in Fig. 5 the shoe consists of side flaps which extend along opposite sides of the pneumatic tube and interlock with the seat or filler I in the manner hereinbefore stated. The pneumatic tube is adapted to be inflated in the usual manner, an air valve X being provided for the purpose.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

In combination a felly, a hollow rim supported upon the felly, a two part filler located within the rim upon the base thereof, stay bolts connecting the rim with the felly and extending across the angles formed between the side members and base, other bolts passing through openings in the side members of the rim and connecting the parts of the filler, a pneumatic tube located within the rim upon the filler, and a tread mounted upon the pneumatic tube and closing the open side of the hollow rim.

In testimony whereof I affix my signature in presence of two witnesses.

JOHN J. LUCK.

Witnesses:
H. J. YOUNG,
LYTLE V. GOSLING.